April 28, 1964    J. H. ROGERS    3,130,796
EARTH CONDITIONING IMPLEMENT
Filed Feb. 13, 1961    3 Sheets-Sheet 1

WITNESS
NORMAN G. TRAVISS

INVENTOR
JOHN HARLAN ROGERS
BY Talbert Dick & Farley
ATTORNEYS

April 28, 1964     J. H. ROGERS     3,130,796
EARTH CONDITIONING IMPLEMENT
Filed Feb. 13, 1961     3 Sheets-Sheet 2

WITNESS
NORMAN G. TRAVISS

INVENTOR
JOHN HARLAN ROGERS
BY Talbert Dick & Jerley
ATTORNEYS

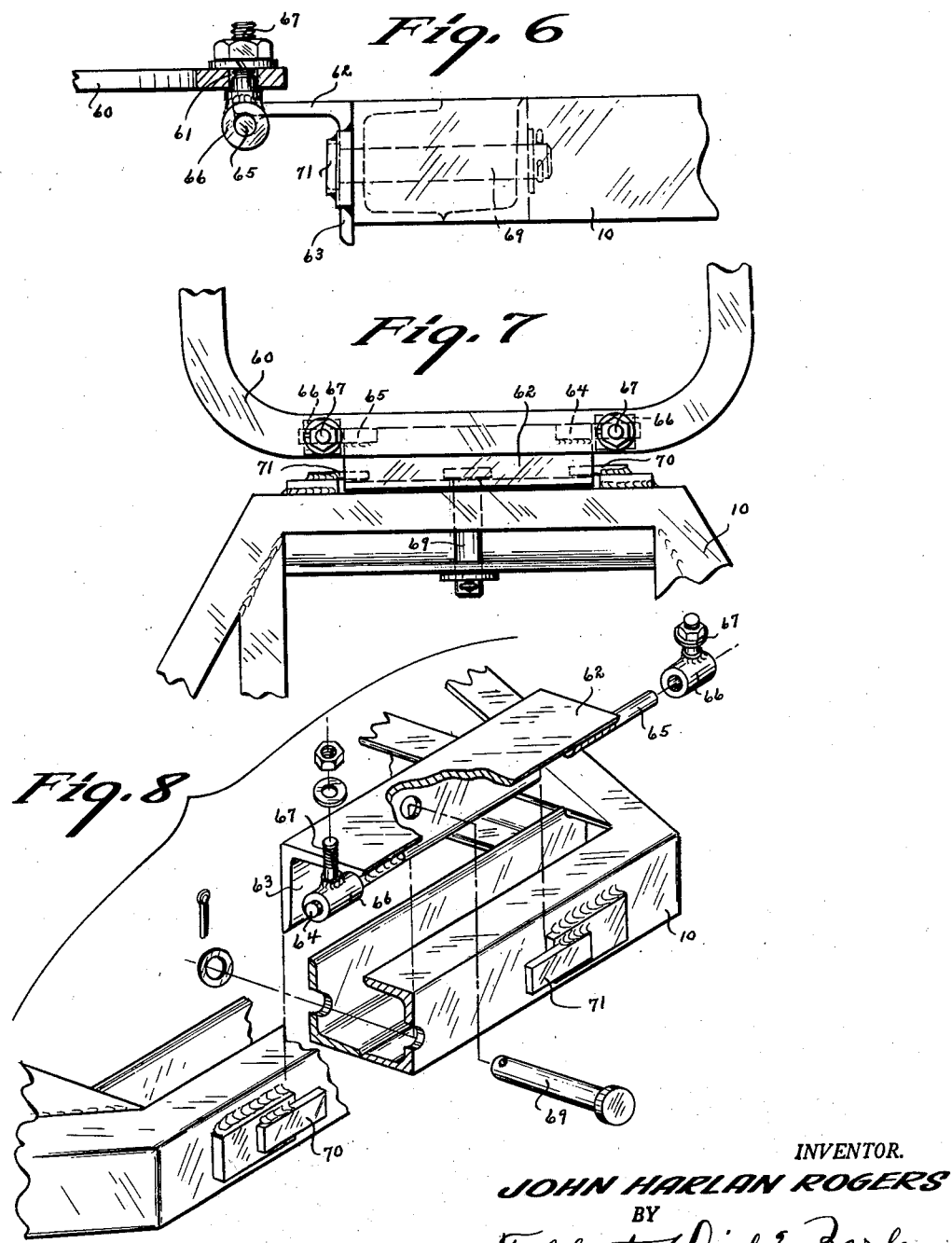

United States Patent Office 3,130,796
Patented Apr. 28, 1964

3,130,796
EARTH CONDITIONING IMPLEMENT
John Harlan Rogers, 622 N. 12th St., Fort Dodge, Iowa
Filed Feb. 13, 1961, Ser. No. 88,935
3 Claims. (Cl. 172—117)

This invention relates to an earth conditioning implement and more particularly to a rotating plowing means that not only cuts up vegetable matter but pulverizes and aerates the soil.

Herebefore agriculturists prepared the ground for planting by plowing. The plow was in the form of either a rigid mold board that merely cut and turned a furrow of soil or was in the form of a disc. In either case the ground was mostly merely cut and turned and not successfully loosened or aerated. Another objection to the old method of plowing was that it did not successfully cut or macerate the standing vegetation and this was particularly true in the case of cornstalks, cane, and like. A further objection to plowing was that large chunks or masses of dirt were not broken up and therefore it was necessary to harrow and further condition the soil before planting. A still further objection to plowing was that due to the fact that dirt was picked up and deposited one furrow over from its original position, a dead furrow or ditch remained down the center of the field. A still further objection to plowing was that it only processed a relatively small strip of ground at a time.

Therefore, one of the principal objects of this invention is to provide an earth conditioning unit that not only successfully plows and breaks up the soil but also cuts up and buries substantially all of the surface vegetation.

A further object of this invention is to provide a field conditioning device that processes a substantial strip of ground each time the implement passes across the field.

A still further object of this invention is to provide an earth conditioning implement of the rotary plow type that is under the complete control of the operator at all times.

A still further object of this invention is to provide a ground conditioning means that leaves the ground in a highly desirable level condition.

A still further object of this invention is to provide an earth conditioning implement that returns the dirt substantially to its original position thereby eliminating dead furrows and like.

A still further object of this invention is to provide a ground conditioning means of the rotary plow type that has blades so formed as to tend to move forwardly and downwardly into the soil when rotated.

Still further objects of my invention are to provide an earth conditioning implement that is economical in manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 6 is an enlarged view of the means for coupling the implement to the tractor.

FIG. 7 is an enlarged top plan view of the coupling means, and

FIG. 8 is an enlarged exploded view of the coupling means.

Figure 1:
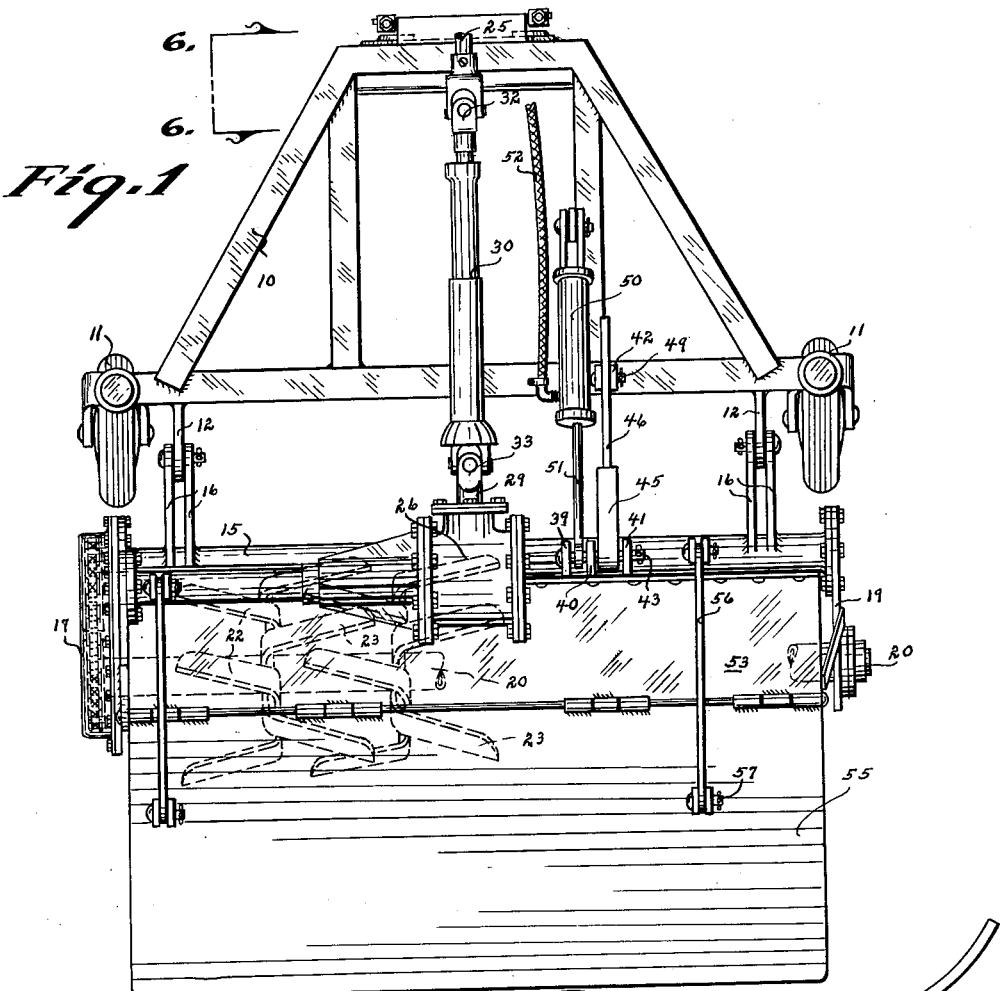
FIG. 1 is a top plan view of my device.
Figure 2:
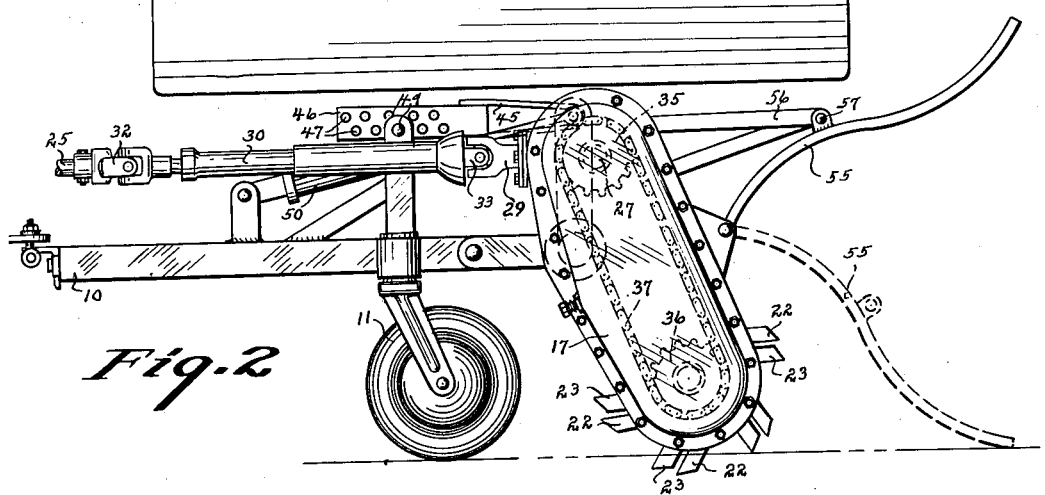
FIG. 2 is a side view of my earth conditioning implement and shows the adjustment of the trailing hood.
Figure 3:
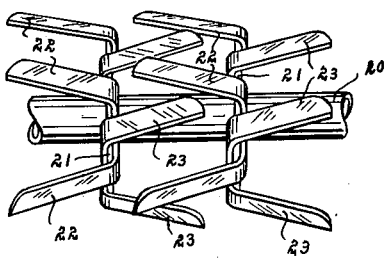
FIG. 3 is a plan view of a section of the rotary plow portion and illustrates the curvature of the blades.
Figure 4:
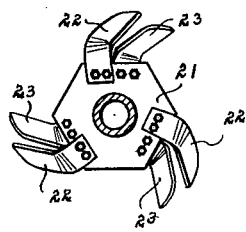
FIG. 4 is a cross-sectional view of the rotary hoe or plow blade portion.
Figure 5:
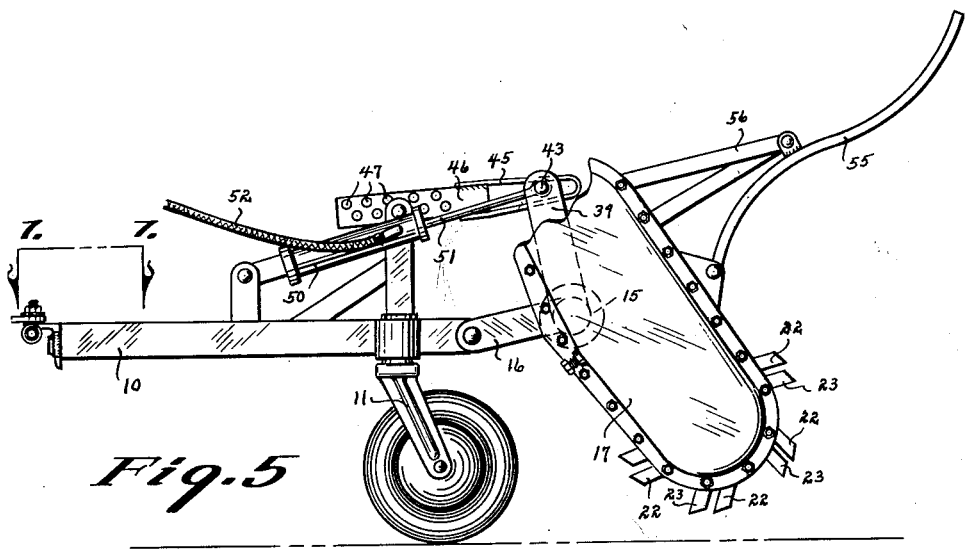
FIG. 5 is a side view of the device with sections cut away to more fully illustrate its construction.

In these drawings I have used the numeral 10 to designate a frame portion adapted to have its forward end detachably connected to the drawbar of a tractor or like. Each rear side of this frame 10 is supported by caster wheel units 11 as shown in FIG. 1. The numeral 12 designates two rearwardly extending spaced apart bars on the rear end of the frame 10. The numeral 15 designates an elongated tubular bearing housing having forwardly extending ears 16 operatively vertically hinged to the two rearwardly extending bars 12. By this arrangement of parts the elongated bearing housing 15 may swing upwardly or downwardly relative to the frame 10. Secured to the left end of the bearing housing 15 is a downwardly and rearwardly extending sealed gear housing 17. The numeral 19 designates a downwardly and rearwardly extending bearing arm secured to the right end of the bearing housing 15. The numeral 20 designates a shaft having one end journaled in the gear housing 17 and its other end journaled in the bearing arm 19. Embracing this shaft 20 is a plurality of spaced apart plates 21. Bolted onto each of the plates 21 is a plurality of cutting blades as shown in FIG. 4. These cutting blades are generally designated by the numerals 22 and 23. The blades 22 extend first radially and then are bent to extend outwardly and laterally to the left. The blades 23 extend first radially and then are bent to extend outwardly and laterally to the right. The blades 22 and 23 on each plate 21 are alternated with each other as shown in FIG. 3. The outer leading edge of each blade is curved or rounded and the width of its outer laterally extending portion is slightly bent at an angle to extend downwardly and rearwardly when it is in its lower position of rotation as shown in FIG. 4. The lateral portions of the blades between adjacent plates 21 cooperate by interlocking or overlapping to form a cage-like structure therebetween. By the angular arrangement of width of the outer portions of the blades, the blades will bite downwardly and rearwardly into the soil such as that of a garden hoe whereby the rotating unit will tend to pull itself downwardly into the ground. However, as the blade moves upwardly from its maximum depth in the ground, the reverse will be true in that it will tend to lift the soil upwardly and carry the same a substantial distance above the ground surface. Obviously, therefore, the blades will successfully serve a plurality of purposes, i.e., they will successfully chop up vegetation and substantially pulverize the soil and lift up the soil for the successful aeration of the soil. Furthermore, the lifting of the soil will leave a most desirable nonpacked loose soil bed ready for seeding. Obviously, the forward leading edge of the rotary hoe blades 22 and 23 may be sharpened to not only facilitate the penetration of the soil but also to cut and chop vegetation into small particles. By the rotation of the blades this cut vegetation will be substantially buried under the surface of the plowed soil. Contrary to that of a disc implement, my blade unit must rotate at a speed substantially greater than that of the speed of the travel of the implement. I therefore power the shaft 20 by operatively connecting it to the power takeoff shaft 25 of the pulling tractor or like. The numeral 26 designates a transmission having a shaft 27 extending into the upper end of the gear box 17. The numeral 29 designates the input shaft of the transmission 26. The numeral 30 designates an ordinary telescoping shaft having one end connected by a universal joint 32 to shaft 25 and its other end connected by the universal joint 33 to the shaft 29. The numeral 35 designates a sprocket wheel inside the gear box 17 and on the outer end of the shaft 27. The numeral 36 designates a spur gear in the gear box 17 and on the shaft 20. The numeral 37 designates an endless chain embracing the spur gears 35 and 36. By this arrangement of parts on the power shaft 25 and rotating the shaft 20 and its hoe blades or knives 22 and 23 will be rotated. The weight of the rear pivoted portion of the implement will, by gravity, move into contact with and into the ground. While this pivoted rear end portion of the implement will float in operation, it is often desirable to limit the downward swinging movement of the rear assembly. However, any stop limiting means must be in only one direction because it is highly desirable that the rear end portion of the implement move freely upwardly against the force of gravity if obstructions or like are encountered. Therefore, on the elongated bearing 15 I have provided three spaced apart upwardly extending posts 39, 40 and 41 and a post 42 extending upwardly from the frame 10. The numeral 43 designates a pin extending through the upper ends of the posts 39, 40 and 41. The numeral 45 designates a U-band embracing the pin 43 between the posts 40 and 41 as shown in FIG. 1. The numeral 46 designates a bar rigidly secured to the two forward ends of the U-member 45 and having a plurality of holes 47. The numeral 49 designates a pin extending through the post means 42 and selectively extending through one of the holes 47 as shown in FIG. 2. By this arrangement of parts an adjustable stop means is provided for limiting the downward swinging movement of the rear pivoted portion of the implement. When the implement is not being used for rotary plowing the right rear end portion of the implement is elevated as shown in FIG. 5. This is accomplished by hydraulic cylinder 50 secured to the frame 10 and with the forward end of its shaft 51 embracing the pin 43 as shown in FIG. 1. The numeral 52 designates a conduit communicating with the inside of the hydraulic cylinder 50 and its other end adapted to be in communication at times with a source of hydraulic pressure.

The numeral 53 designates a curved hood permanently secured to the elongated bearing 15 and extending in spaced relationship over the top of the shaft 20 and its cutting blades 22 and 23. The numeral 55 designates a rear gate hood having its forward edge hingedly secured to the rear edge of the hood 53. This swingably mounted gate hood 55 is of considerable width so that it will normally engage the drag on the plowed soil to the rear of the rotary blades. This has a highly desirable levelling effect to the soil, and in order that the drag action will be smooth and satisfactory the trailing portion of this hinged end hood is curved downwardly and rearwardly as shown in FIG. 2. When it is desired that the end hood 55 be not effective it is held in an upright position. I accomplish this by hingedly securing the forward end of an arm 56 to the bearing 15 and detachably securing the other end of the arm to the rear hood 55 by means of the detachable pin 57.

Any suitable means may be used for connecting the implement to the pulling tractor. However, in order that the implement will move over and conform to the ground surface it is highly desirable that the coupling means permit both vertical and horizontal movement. FIGURES 6, 7 and 8 illustrate such a coupling means. The numeral 60 designates the drawbar of the tractor having the usual bolt receiving openings 61. The numeral 62 designates a bar having a rear downwardly extending flange 63. The numerals 64 and 65 designate two oppositely extending stub shafts on the bar 62. Rotatably embracing each of these stub shafts is a bearing member 66. Each bearing member 66 has a bolt means 67 detachably extending through the bolt openings of the drawbar.

Some changes may be made in the construction and arrangement of my earth conditioning implement without departing from the real spirit and purpose of my invention, and it is my intention to cover my claims, any modified forms of structure or use of mechanical equivalents which may be reasonably included within their scope.

I claim:

1. In an earth conditioning implement, a frame, wheels supporting said frame, a second frame vertically hinged to said first frame, a shaft rotatably mounted in said second frame, means for rotating said shaft, a plurality of spaced apart cutting blades operatively secured to said shaft; each of said blades extending first outwardly and then laterally, stop means for adjustably limiting the swinging movement of said second frame relative to said first frame in one direction; said stop means comprising a post on said second frame having a horizontal pin operative secured to its outer end, a post on said first frame, a bar member having a plurality of spaced apart holes, a bolt means extending through said post and selectively through one of the holes of said bar member, and a movable strap member secured to said bar member and loosely embracing said pin; and a hydraulic cylinder adapted to be in communication with a source of pressure at times operatively vertically secured to said first frame and having a piston operatively hingedly secured to said second frame.

2. In an earth conditioning implement, a frame, wheels supporting said frame, a second frame vertically hinged to said first frame at opposite sides thereof, said second frame in alignment with said first frame relative to the line of travel of said implement, a shaft rotatably mounted in said second frame, means for rotating said shaft, a plurality of spaced apart cutting blades operatively secured to said shaft along its length between opposite ends thereof, means for adjustably pivoting said second frame in a vertical plane relative to said first frame, means on said first frame of adjustably limiting the downward vertical swinging movement of said second frame relative to said first frame, said means on said first frame for adjustably limiting the downward vertical swinging movement of said second frame relative to said first frame comprises a vertically positioned post secured to said first frame, a bar member having a plurality of spaced apart holes, a bolt means extending through said post and selectively through one of the holes of said bar member, a second vertically extending post positioned on said second frame having a horizontal pin operatively secured to its outer end, and a longitudinally movable strap member secured to the bar member and loosely embracing said pin.

3. In an earth conditioning implement, a first frame, wheels supporting said frame, a second frame vertically hinged to said first frame, means carried on said second frame for working the soil, stop means for adjustably limiting the swinging movement of said second frame relative to said first frame in one direction, said stop means comprising an upstanding post on said second frame having a pin operatively secured to its outer end, an upstanding post on said first frame, a bar member having a plurality of spaced apart holes, a bolt means extending through said post on said first frame and selectively through one of the holes of said bar member, and a movable strap member secured to said bar member and loosely embracing said pin, and a hydraulic cylinder adapted to be in communication with a source of pressure at times operatively vertically secured to said first frame and having a piston operatively hingedly secured to said second frame.

References Cited in the file of this patent

UNITED STATES PATENTS

| | | |
|---|---|---|
| 1,258,109 | Goeldner | Mar. 5, 1918 |
| 2,214,702 | Seaman | Sept. 10, 1940 |
| 2,465,488 | Sears et al. | Mar. 29, 1949 |
| 2,485,371 | Duffy | Oct. 18, 1949 |
| 2,527,974 | Tostenrud et al. | Oct. 31, 1950 |
| 2,664,300 | Danielson et al. | Dec. 29, 1953 |
| 2,736,254 | Kropp | Feb. 28, 1956 |
| 2,780,479 | Frieberg | Feb. 5, 1957 |
| 2,886,116 | Howard | May 12, 1959 |

FOREIGN PATENTS

| | | |
|---|---|---|
| 565,742 | Belgium | Mar. 31, 1958 |
| 437,872 | Great Britain | Nov. 6, 1935 |